Aug. 10, 1954 W. FONDILLER 2,686,215

ISOTHERMAL ELECTRIC CABLE

Filed Dec. 12, 1950

INVENTOR
WILLIAM FONDILLER
BY H. A. Burgess
ATTORNEY

Patented Aug. 10, 1954

2,686,215

UNITED STATES PATENT OFFICE 2,686,215

ISOTHERMAL ELECTRIC CABLE

William Fondiller, New York, N. Y., assignor to Bell Telephone Laboratories, Incorporated, New York, N. Y., a corporation of New York Application December 12, 1950, Serial No. 200,473

4 Claims. (Cl. 174—15)

Figures 1, 2:
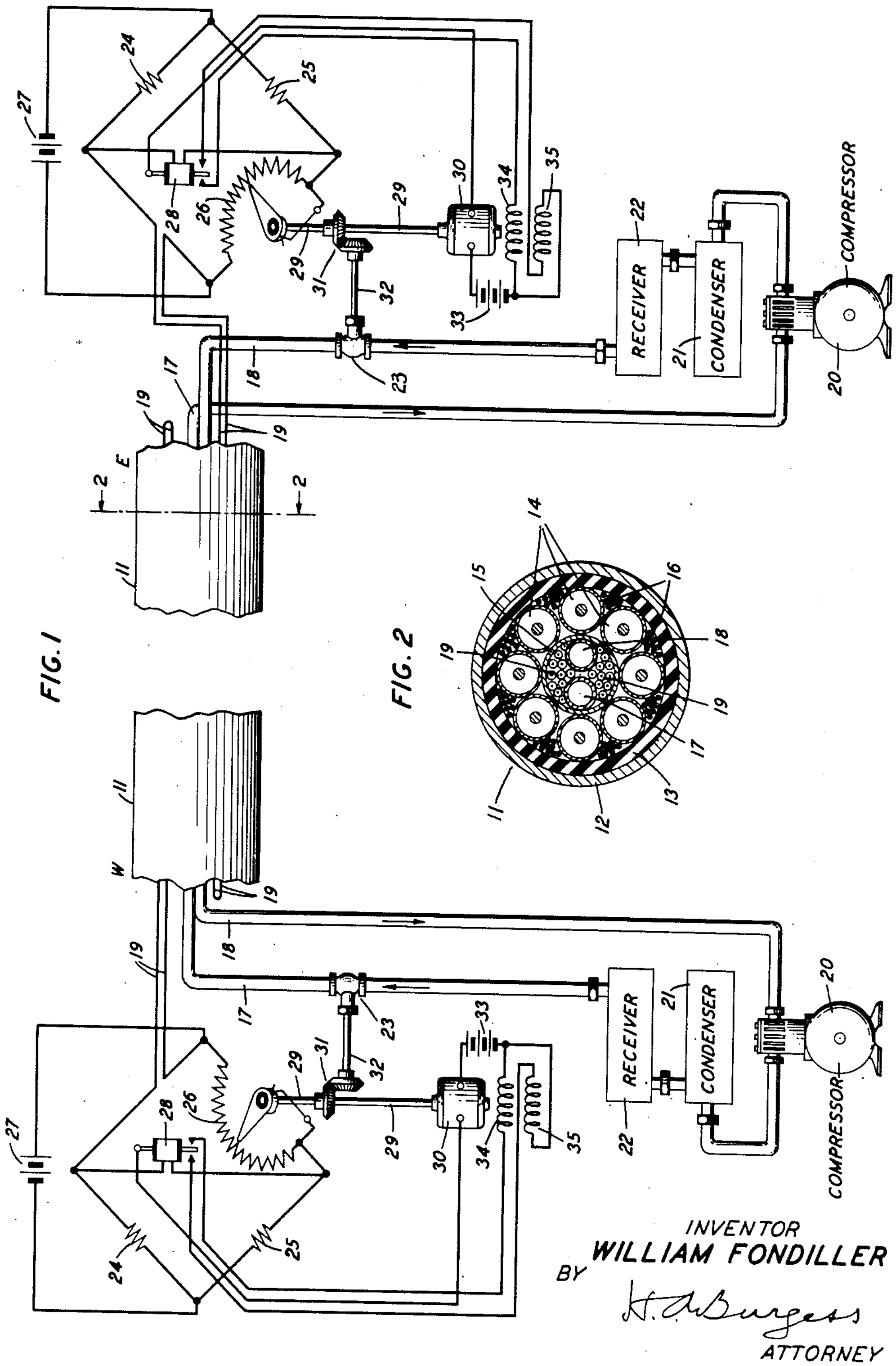

This invention relates generally to electric cables and more particularly to cables used for purposes of electrical communication.

One object of the invention is to maintain the transmission characteristics of electric cables substantially constant under substantially all ambient temperature conditions.

Another and more particular object is to eliminate the need for expensive regulatory apparatus to compensate for variations in cable transmission characteristics due to temperature changes.

Electric cables such as telephone cables normally carry only the feeble currents of electrical communication and their temperatures are, therefore, controlled by the ambient temperature. Wide temperature changes, however, have an adverse effect on the operating characteristics of such cables. In a long telephone cable, for example, temperature effects due to atmospheric changes may cause an attenuation change of as much as twenty-five per cent between minimum and maximum temperatures. Aerial cables, especially, are subject to wide diurnal and seasonal temperature variations. Changes in transmission level of this magnitude are intolerable, and it has heretofore been necessary to provide regulators in long telephone circuits which automatically adjust the amplification of repeaters to compensate for temperature effects. In a coaxial system, the cost of the equipment for regulation is often as much as twenty per cent of the cost of the repeaters.

In accordance with a principal feature of the present invention, variations in the operating characteristics of a telephone cable caused by changes in the ambient temperature are eliminated by maintaining a substantially constant cable temperature, i. e., within plus or minus half a degree Fahrenheit from a predetermined level. With the variations in operating characteristics eliminated, there is no necessity of providing expensive equipment to regulate the amplification of the repeaters in the circuit to compensate for such variations.

In accordance with another feature of the invention, the temperature of a telephone cable is depressed below the ambient temperature. For any given period of time, the temperature of the cable is held substantially constant at a point equal to or less than the lowest expected ambient temperature. In addition to eliminating variations in the transmission characteristics of the cable caused by temperature changes, this feature of the invention enables the cable to give improved attenuation performance, since the direct-current resistance of the cable decreases directly with temperature.

In accordance with a further feature of the invention, cooling fluid is circulated through at least one fluid-carrying channel located in the central portion of the cable. The channel or channels are so placed in order to obtain the most favorable temperature gradient relative to ambient temperatures. By way of example, at least two general types of refrigeration may be used. With one, a low temperature brine is circulated through the channel or channels, while with the other, refrigeration depends upon the vaporization of a suitable liquid. The electrical insulation inside the cable sheath will generally provide sufficient heat insulation to facilitate the refrigeration process. If desired, a supplementary heat insulating sheath may also be provided.

In accordance with still another feature of the invention, temperature-sensitive means within the cable is utilized to maintain the cable temperature at the assigned level. Such temperature-sensitive means serves to detect variations in cable temperature and to supply a control signal which actuates a mechanism for regulating the flow of cooling fluid. By way of example, the temperature-sensitive means may have a resistance which changes with temperature and be connected into a bridge circuit which, in turn, controls a valve regulating the flow of refrigerant.

A more complete understanding of the invention may be obtained from a study of the following detailed description of a specific embodiment. In the drawing:

Fig. 1 is a schematic diagram of an embodiment of the invention which includes a telephone cable; and Fig. 2 shows a cross section of the telephone cable, taken along the line 2—2.

The isothermal cable system shown in Fig. 1 includes a length of cable 11, a cross section of which is shown in Fig. 2.

In Fig. 2, the cable is shown to be surrounded by a lead sheath 12, inside of which is a heat insulating layer 13. A number of coaxial transmission lines 14 are spaced around the periphery of the cable on the inside of insulating layer 13 and are held in place by a spacing element 15, which may be of lead or other metal in combination with a suitable compound. Insulated pairs of wire 16 are inserted in the crevices between coaxial lines 14. Inside of spacer 15 are a pair of metal tubes 17 and 18, which are provided as channels for the flow of the refrigerant and extend the length of the cable. Additional insulated pair conductors 19 fill the spaces within spacer 15 which are not occupied by tubes 17 and 18. It is to be noted that the heat insulating layer 13 shown inside the lead sheath 12 would not be required in the newer telephone cable designs which provide a sheathing of polyethylene or other heat-insulating compound over the outside of the cable.

Referring again to Fig. 1, W and E signify the west and east terminals, respectively, of a section of toll telephone cable 11, in which tubes 17 and 18 extend throughout the length of cable 11. The refrigerant-circulating mechanisms are substantially the same at both terminals and, for that reason, are described together, with like parts bearing like reference numerals. The only difference between the two mechanisms is that they are connected in an opposite manner to tubes 17 and 18.

The west end of tube 18 is connected to a motor-driven compressor 20, which is, in turn, connected to a condenser 21 and a receiver 22. Receiver 22 functions as an expansion chamber and is connected to the west end of tube 17 through a motor-driven valve 23, which controls the flow of the refrigerant. At the east end of cable 11, the end of tube 17 is connected to compressor 20, while the end of tube 18 is connected to motor-driven valve 23. Thus, cooling fluid is circulated the length of cable 11 through tube 17 in one direction and back through tube 18 in the opposite direction. Cooling means is provided at both ends of cable 11 and the same refrigerant is used continuously.

In order to maintain the cable temperature substantially constant, temperature-sensitive control circuits are provided for each valve 23. A pair of wires 19 is associated with each valve 23 for control purposes. Each pair of wires 19 which is so used is joined at the end of cable 11 away from the valve 23 which is to be controlled. At their other ends, each pair is connected as one arm of a bridge circuit. At each terminal of cable 11, this bridge circuit is composed of, in its respective arms, a pilot wire comprising a joined pair of cable conductors 19, a first resistor 24, a second resistor 25, and a slide wire rheostat 26. A battery 27 is connected between the junctions of resistors 24 and 25 and of the pilot wire and the resistance arm of rheostat 26. A polarized relay 28 is connected between the other two corners of the bridge circuit.

Rheostat 26 is of the type having a circular resistance arm and a rotary contactor. The end of the resistance arm connected to resistor 25 is also joined to the contactor. The rotary contactor is, in turn, mechanically coupled to a drive shaft 29 which extends from a direct-current reversing valve motor 30. Between motor 30 and rheostat 26, shaft 29 is geared through a gear mechanism 31 to a connecting shaft 32 which, in turn, serves to control the opening of valve 23. Valve motor 30 is connected with one armature brush joined to the contactor of polarized relay 28 and the other joined to the positive terminal of a direct-current source 33. Motor 30 has two field coils 34 and 35, shown schematically in Fig. 1, each connected one side to respective contacts of relay 28, and the other side to the negative terminal of direct-current source 33. Windings 34 and 35 are so connected that, when energized, one causes the armature of motor 30 to turn in one direction while the other causes it to turn in the opposite direction.

A long telephone transmission line may be made up of a number of refrigerated cable sections with coolant pumping stations located between each section. The exact spacing of pumping stations will depend upon such practical considerations as the type of refrigerant used, the fluid-carrying capacity of tubes 17 and 18, and the ambient temperatures encountered.

In the operation of the embodiment of the invention which has been described, the refrigerant is circulated through tubes 17 and 18 in opposite directions. A variable flow is mainttained with a fixed quantity of refrigerant. The oppositely directed flow tends to equalize the temperature throughout the refrigerated section of cable because of the opposite temperature gradients at the cable ends, thus promoting effectiveness of operation.

The flow through the tubes 17 and 18 is regulated by the motor-driven valves 23 at their respective upstream terminals, with each valve 23 being controlled by its respective pilot wire. The bridge circuits have their components chosen so that they are balanced when the cable temperature is at the predetermined level. Under such conditions the flow of the coolant remains constant and no current flows through the polarized relay 28. If the temperature of cable 11 rises above the predetermined level, the resistance of the pilot wire increases, since the copper conductors 19 have a positive temperature coefficient of resistance. The bridge becomes unbalanced, current flows through polarized relay 28, and one of the field windings 34 or 35 is energized. The motor 30 causes shafts 29 and 32 to revolve in the direction to open valve 23 to greater flow of the coolant and to increase the resistance introduced into the bridge circuit by rheostat 26. The automatic adjustment of rheostat 26 balances the bridge once more, causing the contact in relay 28 to open and motor 30 to stop. The refrigerant thus continues to flow at an increased rate until the pilot wire is cooled sufficiently to unbalance the bridge again. When the pilot wire resistance decreases due to a drop in ambient temperature, current flows through relay 28 in the opposite direction, causing the other motor field winding to be energized. Motor 30 then turns shaft 29 in the reverse direction tending to close the opening in valve 23 and once again balancing the bridge circuit. Thus, the refrigerating system is automatically controlled to keep the cable temperature within approximately half a degree Fahrenheit of the predetermined value and variations in the transmission characteristics of the cable due to temperature changes are avoided.

The temperature at which cable 11 is maintained is chosen so as to be equal to or lower than the lowest ambient temperature to which cable 11 is likely to be subjected. From the standpoint of maintaining fixed cable transmission properties, it is immaterial how far below the ambient temperature the cable temperature is maintained, the effect of a wide differential being only to require a more rapid circulation of refrigerant than a smaller differential would require.

Several cable temperatures may be selected for purposes of economy of operation. Thus the cable may be maintained at a temperature equal to or lower than the lowest expected atmospheric temperature during the winter months and at a similarly determined but higher temperature during the summer months. Two or three cable temperatures may be selected, depending on the season of the year, and repeater amplification may be adjusted manually at such widely separated intervals. Similarly, sections of cable in a long transmission system refrigerated in accordance with the present invention may in any one season be kept at different temperatures, the temperature levels chosen depending on the geographical location of the particular sections. It is essential only that substantially isothermal conditions be maintained in each cable section, the temperature of which is controlled independently of all other sections. Thus, in a transcontinental cable, the control temperature of cable crossing the Mississippi Valley may be twenty degrees higher than that of cable over the Rocky Mountains. The expense of refrigeration can thereby be kept at a minimum.

Certain features of the present invention, in addition to promoting stability in the transmission characteristics of a cable, have the advantage of enabling a cable to give improved attenuation performance, since the direct-current resistance of the cable conductors decreases with temperature. Depending on the character of the refrigerant and the frequency of placement of the pumping stations, the cable temperature may be lowered by fifty degrees Fahrenheit or more. Assuming a temperature depression of fifty degrees, the direct-current resistance would be reduced by about ten per cent. It has been found that the effective or alternating-current resistance of a circuit varies as the square root of the direct-current resistance. Since, in a coaxial cable, the attenuation at transmission frequencies is largely due to the effective resistance, the present invention enables a reduction in attenuation of about six per cent to be realized. This reduction in attenuation permits greater spacing between repeater stations in a transmission system, and the resulting decrease in the amount of equipment required provides further economies.

Because of the importance of maintaining toll telephone cables in service under adverse conditions, it has heretofore been the practice to apply gas pressure to such cables and install indicators which would disclose the existence of a leak in the cable sheath which might cause failure of the circuits in the cable. The function previously performed by gas pressure installations can be performed by the temperature-control apparatus which has been described, since any leak in the cable would immediately be reflected in the action of the temperature-sensing equipment.

Instead of using one or more tubes of adequate diameter for the circulation of refrigerant through the cable, other fluid circulating methods may be found to be expedient. For example, a diaphragm may be used to divide the cross section of the cable into two semicircular areas, providing a pair of channels extending the length of the cable for the passage of the refrigerant.

While the invention has been described with reference to a telephone cable, it is applicable to many other types of electric cables. Further, it is to be understood that the arrangement which has been described is illustrative of the principles of the invention. Numerous other arrangements may be devised by those skilled in the art without departing from the spirit and scope of the invention.

What is claimed is:

1. An electrical signal transmission system in which the transmisson characteristics are maintained substantially constant under substantially all ambient temperature conditions which comprises an electric cable having a hollow sheathing of heat insulating material, a multiplicity of substantially identical electrical signal conductors within said sheathing extending along the length thereof, said conductors being electrically insulated from each other, and at least one fluid-carrying channel within said sheathing extending along the length thereof, a source of cooling fluid coupled to said channel to supply cooling fluid thereto to reduce the temperature of the conductors of said cable to a predetermined level, and means to maintain the temperature of said conductors accurately at said predetermined level, said last-mentioned means comprising a valve coupled between said source and said channel to regulate the flow of cooling fluid and a bridge circuit including at least one of said electrical conductors as a resistance arm thereof connected to control the opening and closing of said valve.

2. An electrical signal transmission system in which the transmission characteristics are maintained substantially constant under substantially all ambient temperature conditions which comprises an electric cable having a hollow sheathing of heat insulating material, a multiplicity of substantially identical electrical signal conductors within said sheathing extending along the length thereof, said conductors being electrically insulated from each other, and at least one fluid-carrying channel within said sheathing extending along the length thereof, means to circulate cooling fluid through said channel to reduce the temperature of the conductors of said cable to a predetermined level, and means including a pair of said electrical conductors connected as one of the resistance arms of a bridge circuit to increase the flow of cooling fluid whenever the temperature of the conductors of said cable rises above said predetermined level and to decrease the flow of cooling fluid whenever the temperature of the conductors of said cable falls below said predetermined level.

3. An electrical signal transmission system in which the transmission characteristics are maintained substantially constant under substantially all ambient temperature conditions which comprises an electric cable having a hollow sheathing of heat insulating material, a multiplicity of substantially identical electrical signal conductors within said sheathing extending along the length thereof, said conductors being electrically insulated from each other, and a pair of fluid-carrying channels within said sheathing extending together along the length thereof, first and second sources of cooling fluid coupled to respective ones of said channels to supply cooling fluid thereto to reduce the temperature of the conductors of said cable to a predetermined level, and means to maintain the temperature of said conductors accurately at said predetermined level, said last-mentioned means comprising a first valve coupled between said first source and its respective channel to regulate the flow of cooling fluid in that channel, a bridge circuit including a pair of said electrical conductors as a resistance arm thereof to control the opening and closing of said first valve, a second valve coupled between said second source and its respective channel to regulate the flow of cooling fluid in that channel, and a bridge circuit including another pair of said electrical conductors as a resistance arm thereof to control the opening and closing of said second valve.

4. An electrical signal transmission system in accordance with claim 3 in which said first and second sources of cooling fluid are at opposite ends of said electric cable to circulate cooling fluid through said channels in opposite directions.

References Cited in the file of this patent

UNITED STATES PATENTS

| Number | Name | Date |
|---|---|---|
| Re. 11,865 | Tesla | Oct. 23, 1900 |

8

| Number | Name | Date |
|---|---|---|
| 1,948,964 | Gay | Feb. 27, 1934 |
| 2,477,728 | FitzGerald | Aug. 2, 1949 |
| 2,535,187 | Anderson et al. | Dec. 26, 1950 |

FOREIGN PATENTS

| Number | Country | Date |
|---|---|---|
| 465,342 | Great Britain | Apr. 30, 1937 |
| 612,482 | Great Britain | Nov. 12, 1948 |